June 28, 1927.
C. PAULY
CHEESE MOLD
Filed May 21, 1926
1,634,041
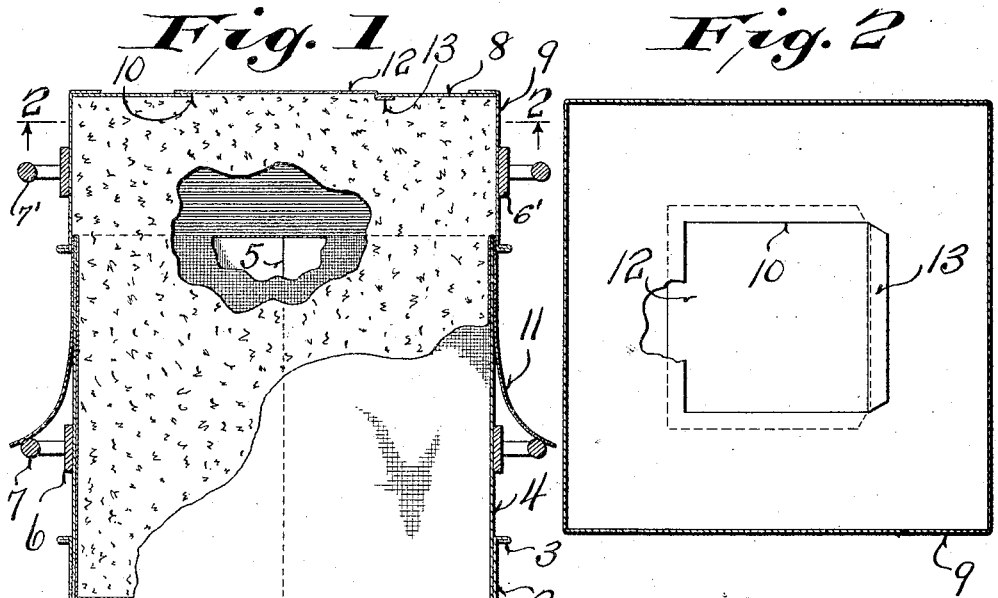
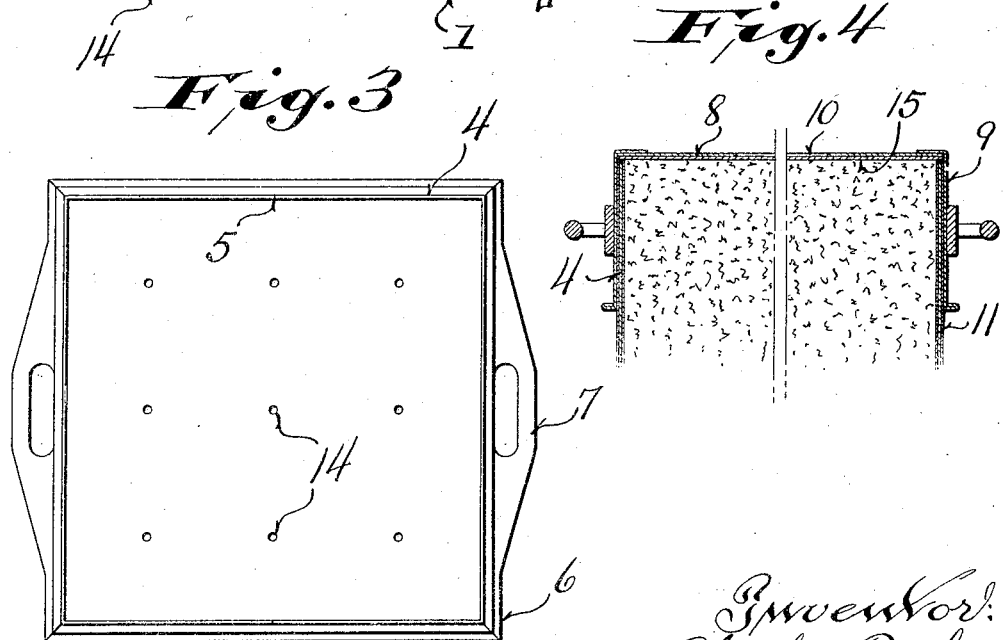
Inventor:
Charles Pauly Patented June 28, 1927.

1,634,041

UNITED STATES PATENT OFFICE.

CHARLES PAULY, OF PORT WASHINGTON, WISCONSIN, ASSIGNOR TO PAULY AND PAULY CHEESE COMPANY, OF MANITOWOC, WISCONSIN.

CHEESE MOLD.

Application filed May 21, 1926. Serial No. 110,644.

This invention relates to cheese molds.

Objects of this invention are to provide a novel form of cheese mold which is so constructed that cheese may be readily shaped and compressed therein to the requisite size, and which is provided with a strong, rigid base carrying side members to permit the ready discharge of the cheese from the mold as the members are permitted to spring away from the cheese.

Further objects of this invention are to provide a cheese mold having a lower portion and an upper portion arranged in a telescopic relation, the upper portion being provided with a filling aperture adapted to be closed by a plate, and to so construct the parts that the plate may be readily removed after the initial compression and may be replaced by a finishing plate.

Further objects are to provide a cheese mold of strong and durable construction and one which may be readily and easily handled.

An embodiment of the invention is shown in the accompanying drawings, in which:

Figure 1 is a sectional view through the mold showing the filled end positioned for initial compression.

Figure 2 is a sectional view on the line 2—2 of Figure 1.

Figure 3 is a view looking into the bottom portion of the mold.

Figure 4 is a fragmentary view corresponding to Figure 1 showing the parts in their final position.

Referring to the drawings, it will be seen that the mold comprises a base portion 1 which is equipped with upwardly extending sides 2 reenforced by an outwardly projecting marginal flange 3. The side portions 4 of the mold are positioned within the base as shown in Figure 1, so that the side portions 2 of the base are outermost. These side portions are split along opposite sides as indicated at 5 in Figures 1 and 3. Further, it is to be noted from reference to Figures 1 and 3 that the bottom portion of the mold is provided with a reenforcing bracket or band member 6 which is equipped with outwardly projecting manipulating handles 7.

The upper portion of the mold telescopically fits the lower portion, and is provided with a top 8 and sides 9, such sides sliding over the sides 4 as shown in Figure 1. This top is provided with a filling opening 10. The upper portion is provided with a reenforcing band 6' and with handles 7'. Thus, the cheese may be placed in the lower compartment or lower portion of the mold and the top may be placed in the position shown in Figure 1, overlapping the cloth covering 11 of the cheese. Thereafter, additional cheese is passed into the mold through the opening 10. When the mold is completely filled, an initial covering plate 12 is positioned so as to close the opening 10. This covering plate 12 is provided with a tongue or flange 13, which as may be seen from Figures 1 and 2, is passed into the opening and hooked beneath a marginal portion thereof. The covering plate is of such a size as to completely close the opening 10. The cheese is thereafter placed in the press and the top is forced down to compress the cheese, liquid being permitted to drain or pass from the mass through the openings 14.

It is to be noted that a slight ridge or ribbed portion is left where the opening 10 occurs, and this may be readily removed by removing the cover and the plate 12. Thereafter the cover is repositioned with a large plate 15 slipped therein as shown in Figure 4, and the cheese is given its final pressing.

In discharging the cheese from the mold, it is to be noted that the parts may be easily manipulated by means of the handles, and further, it is to be noted that due to the slit 5 formed on opposite sides of the bottom portion of the mold that the bottom portion will open out slightly and permit the ready discharge of the cheese.

It will, therefore, be seen that a novel and strong type of cheese mold has been provided which may be very readily employed in forming cheeses, and which is so constructed that the cheese may be readily filled into the mold prior to pressing and may be easily discharged therefrom.

Although the invention has been described in considerable detail, such description is intended as illustrative rather than limiting as the invention may be variously embodied and as the scope of such invention is to be determined as claimed.

I claim:

A cheese mold comprising a bottom portion and a top portion arranged telescopically and adapted to compress a cheese between them, said top portion having a filling aperture and a removable plate covering said filling aperture, and having a positioning tongue adapted to be passed through said aperture and to engage a marginal portion adjacent such aperture.

In testimony that I claim the foregoing I have hereunto set my hand at Manitowoc, in the county of Manitowoc and State of Wisconsin.

CHARLES PAULY.